US009934187B2

United States Patent
Shih

(10) Patent No.: US 9,934,187 B2
(45) Date of Patent: Apr. 3, 2018

(54) HOT-PLUGGABLE COMPUTING SYSTEM

(71) Applicant: Quanta Computer Inc., Taoyuan (TW)

(72) Inventor: Ching-Chih Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 354 days.

(21) Appl. No.: 14/708,857

(22) Filed: May 11, 2015

(65) Prior Publication Data

US 2016/0179734 A1    Jun. 23, 2016

Related U.S. Application Data

(60) Provisional application No. 62/093,267, filed on Dec. 17, 2014.

(51) Int. Cl.
| | |
|---|---|
| H05K 7/10 | (2006.01) |
| G06F 1/00 | (2006.01) |
| G06F 13/40 | (2006.01) |
| G06F 13/16 | (2006.01) |
| G06F 13/42 | (2006.01) |
| G06F 13/38 | (2006.01) |
| G06F 1/32 | (2006.01) |

(52) U.S. Cl.
CPC ........ *G06F 13/4081* (2013.01); *G06F 1/3203* (2013.01); *G06F 13/16* (2013.01); *G06F 13/385* (2013.01); *G06F 13/4022* (2013.01); *G06F 13/4282* (2013.01)

(58) Field of Classification Search
USPC .......... 710/300–317, 104–110; 713/300–340
See application file for complete search history.

(56) References Cited

U.S. PATENT DOCUMENTS

| | | | | |
|---|---|---|---|---|
| 6,968,414 B2 * | 11/2005 | Abbondanzio | ....... | G06F 13/409 710/104 |
| 7,295,442 B2 * | 11/2007 | Garnett | ................... | G06F 1/183 361/679.31 |
| 7,543,191 B2 * | 6/2009 | Li | ......................... | G06F 11/221 710/100 |
| 8,595,404 B2 * | 11/2013 | Liu | ..................... | G06F 13/4081 707/999.1 |

(Continued)

FOREIGN PATENT DOCUMENTS

| | | |
|---|---|---|
| CN | 103210379 A | 7/2013 |
| CN | 203039796 U | 7/2013 |
| TW | 201216080 A | 4/2012 |

OTHER PUBLICATIONS

Taiwanese Office Action dated Jun. 27, 2016 for corresponding Taiwanese Patent Application No. 104125262.

*Primary Examiner* — Raymond Phan
(74) *Attorney, Agent, or Firm* — Nixon Peabody LLP; Eduardo J. Quinones; Zhou Lu

(57) ABSTRACT

Embodiments generally relate to hot-plug technology. The present technology discloses hardware and software specifications that can enable hot-plug functions for high-bandwidth and low-latency data transmission within a computing system. The present technology can provide hot-plug functions to PICe devices within a server rack by utilizing various controllers and power indicators embedded in the system. In addition to PCIe, the present technology can provide hot-plug functions to other high-throughput computer I/O (Input/Output) expansion technologies.

20 Claims, 10 Drawing Sheets

(56) References Cited

U.S. PATENT DOCUMENTS

| | | | |
|---|---|---|---|
| 9,588,571 B2* | 3/2017 | Huang | G06F 1/3234 |
| 2004/0015638 A1* | 1/2004 | Forbes | H04L 49/45 |
| | | | 710/316 |
| 2004/0225816 A1* | 11/2004 | Leigh | G06F 13/4081 |
| | | | 710/305 |
| 2008/0052437 A1* | 2/2008 | Loffink | G06F 1/189 |
| | | | 710/302 |
| 2008/0282013 A1* | 11/2008 | Chen | G06F 13/409 |
| | | | 710/306 |
| 2010/0250810 A1* | 9/2010 | Abdul | H04L 69/40 |
| | | | 710/260 |
| 2011/0138095 A1* | 6/2011 | Campbell | G06F 13/409 |
| | | | 710/301 |
| 2011/0191514 A1* | 8/2011 | Wu | G06F 1/26 |
| | | | 710/301 |
| 2014/0108692 A1* | 4/2014 | Doglio | H05K 7/1489 |
| | | | 710/300 |
| 2016/0116961 A1* | 4/2016 | Kunnathur Ragupathi | |
| | | | G06F 1/32 |
| | | | 713/320 |

* cited by examiner

HOT-PLUGGABLE COMPUTING SYSTEM

RELATED APPLICATIONS

This application claims priority to U.S. provisional application 62/093,267, filed Dec. 17, 2014, and entitled "Hot-Plug Control Mechanism for External PCI Device Box", the disclosure of which is hereby incorporated herein by reference in its entirety for all purposes.

FIELD OF THE INVENTION

The disclosure relates generally to hot-plug technology for a computer system.

BACKGROUND

A data center typically includes a large group of servers or nodes for remote storage, processing or distribution of large amounts of data. For example, a data center can comprise a large number of rack units each housing numerous nodes and integrated switches. These nodes and switches can transmit data through layers of network interfaces and protocols.

A system bus is a link through which signals can be transmitted between two or more nodes or switches. For example, Peripheral Component Interconnect (PCIe) bus is a universal system bus that enables computing components, including processor, chipset, cache, memory, expansion cards, and storage devices, to communicate with each other. PCIe hot-plug technology enables PCIe devices to be added or removed from a computer without interrupting normal system operation or requiring a system reboot. By reducing latency in powering off and rebooting the system, PICe hot-plug technology can improve system performance as well as efficiency.

SUMMARY

Aspects of the present technology disclose techniques that enable high-bandwidth and low-latency data transmission using Peripheral Component Interconnect Express (PCIe) hot-plug technology.

According to some embodiments, the present technology can provide hardware and software specifications for hot-plug functions between an integrated switch and a group of nodes. In modern network design, computer manufactures have decoupled a NIC from a node and embedded it into an integrated switch in communication with the node. By decoupling the NIC, the system can take advantage of the high-bandwidth and low latency PCIe protocol for data transmission between the node and the switch.

The present disclosure utilizes standard elements defined by the Peripheral Component Interconnect Special Interest Group (PCI-SGI) for hot-plug technology. Examples of the standard elements include a LED Power Indicator, a LED Attention Indicator, a Manually-operated Retention Latch (MRL), a MRL Sensor, an Attention Button, a Software User Interface, or Slot Numbering.

According to some embodiments, the present technology can adopt a LED pattern monitor to manage LED patterns for hot-pluggable devices, including switches, computing nodes or storage nodes. The LED pattern monitor can be a microprocessor that can control a work mode (e.g., on/off/blinking) of the LED by implementing one or more LED pattern logics. According to some embodiments, the LED pattern monitor can synchronize various input signals and generate a single output signal for indicating whether a hot-add sequence or a hot-remove sequence is completed. The single output signal can be transmitted to a power indicator of a specific device, such as a power indicator LED, for indicating an operational state of the device.

According to some embodiments, the present technology can utilize an interrupt signal controller, e.g., a general purpose I/O expander, for enabling the hot-plug functions. An example of such an I/O expander can be a PCA 9559. For example, in response to receiving a hot-add signal, the interrupt signal controller can generate a hot-plug interrupt signal for a hot plug controller. The hot plug controller can accordingly control a power supply of the service device. The hot plug controller can load or unload a corresponding driver of the service device.

According to some embodiments, a BMC can emulate the functions of the LED pattern monitor and manage LED patterns for the hot-pluggable device. According to some embodiments, a BMC can emulate the functions of an interrupt signal controller.

According to some embodiments, a work mode of a LED power indicator (on/off/blinking) can be determined by the LED pattern monitor using one or more LED pattern logics as described herein.

According to some embodiments, the present technology can add or remove a network switch using a switch hot-add sequence or a switch hot-remove sequence as disclosed herein. The hot-added or hot-removed switch can be an integrated switch, which is connected to the group of nodes using a PCIe bus. According to some embodiments, the hot-added switch can include a group of NICs for a group of nodes.

According to some embodiments, the present technology can add or remove a node using a node hot-add sequence or a node hot-remove sequence as discussed herein. A node can be a storage node, a compute node, or any other compute/storage functional node.

Although many of the examples herein are described with reference to a PCIe bus, it should be understood that these are only examples and the present technology is not limited in this regard. Rather, any system bus that provides connections between computer components may be used, such as the Industry standard architecture (ISA) I/O Bus, or VESA Local Bus (VLB).

Additionally, even though the present discussion uses a BMC as an example of a service controller, the present technology is applicable to other service controller that is independent from the main CPU and operation system.

Additional features and advantages of the disclosure will be set forth in the description which follows, and, in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Various embodiments or examples ("examples") of the invention are disclosed in the following detailed description and the accompanying drawings.

DETAILED DESCRIPTION

Figure 1:
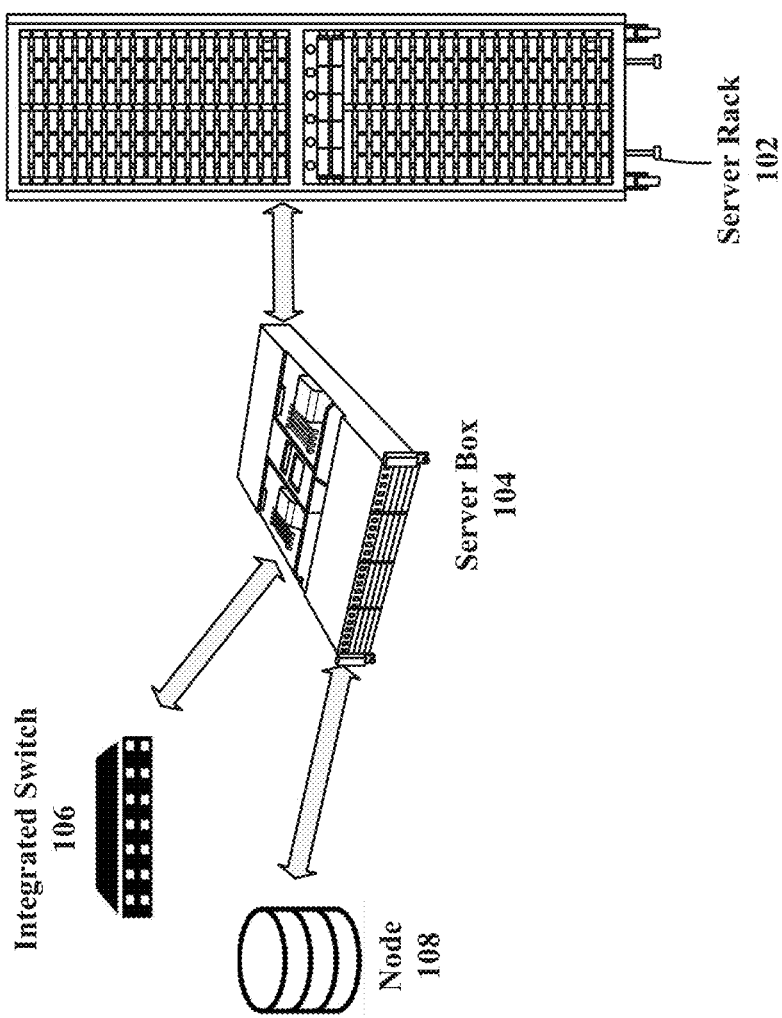
FIG. 1 illustrates an overall system diagram including a server rack with various PICe devices, according to some embodiments.

Various embodiments of the present technology are discussed in detail below. While specific implementations are discussed, it should be understood that this is done for illustration purposes only. A person skilled in the relevant art will recognize that other components and configurations may be used without departing from the spirit and scope of the present technology.

For optimal system performance, a computing system demands high-bandwidth and low-latency data transmission with hot-plug functionality. A system with hot-plug functionality can add or remove components without shutting down or rebooting the system, thereby substantially reducing system downtime.

New computing/networking architecture for high-throughput data transmission (e.g., in data centers) has created on-going challenges for hot-plug technology, which has traditionally been based on legacy computing structures. For example, conventional built-in switches in a server rack use an Ethernet interface for signal routing pursuant to IEEE 802.3. Ethernet is a reliable protocol that offers high-throughput capacity. However, compared with other high bandwidth system interfaces, e.g., PCIe, an Ethernet interface may have lower bandwidth and higher latency. Consequently, Ethernet interfaces or other Network Interface Controllers (NICs) can be a bottleneck in high-speed data transmission. One approach is to remove the NIC from a node and embed the NIC into the silicon of a switch, such as a die.

For example, Red Rock Canyon™ Switch provided by Intel™ comprises multiple built-in NICs, e.g., 4 NICs in one switch, for the multiple nodes that communicate with the switch.

However, the multiple built-in NICs create a new challenge for hot-plug functions as the existing PCIe hot-plug specification only defines hot-plug technology between a PICe device and its corresponding host device, and does not offer hardware or software specifications for hot-plug functions between, for example, multiple PCIe devices and multiple host devices.

Thus, there is a need to provide versatile hot-plug functions for high-bandwidth and low-latency data transmission within a computing system.

A PCIe bus is a high-speed serial computer I/O (Input/Output) system bus for connecting various peripheral devices. By utilizing point-to-point serial lines instead of a shared parallel bus architecture, a PCIe bus is able to provide high-bandwidth and low-latency data transmission, e.g. over 30 GB/s, for a version 4.0 16-lane slot, in each direction.

According to some embodiments, the present technology can provide hot-plug functions to PCIe devices by utilizing various controllers and power indicators embedded in the system. In addition to PCIe, the present technology can provide hot-plug functionalities to other high-throughput computer I/O expansion technologies According to some embodiments, the present technology can utilize a LED pattern monitor to manage LED patterns for hot-pluggable devices, such as switches, computing nodes or storage nodes. The LED pattern monitor can be a microprocessor that can control a work mode (e.g., on/off/blinking) of the LED by implementing one or more LED pattern logics. According to some embodiments, the LED pattern monitor can synchronize various input signals and generate a single output signal, which can indicate whether a hot-add sequence or a hot-remove sequence is completed. The output signal can be transmitted to a power indicator of a specific device, such as a power indicator LED, for indicating, for example, whether it is appropriate to remove a device.

According to some embodiments, aspects of the present technology include utilizing an interrupt signal controller, e.g., a general purpose I/O expander, for enabling the hot-plug functions. An example of such an I/O expander can be a PCA 9559. It can provide expansion capability such as LED control for main microprocessors. For example, in response to receiving a hot-add signal, the interrupt signal controller can generate a hot-plug interrupt signal for a hot plug controller. The hot plug controller can accordingly control a power supply of the service device. The hot plug controller can also load or unload a corresponding driver of the service device.

A BMC is an independent and embedded microcontroller that, in some embodiments, is responsible for the management and monitoring of peripheral devices, e.g., switches, computing nodes and storage nodes. A BMC can communicate with other devices via Intelligent Platform Management Interface (IPMI) specification by using an I2C bus. The IPMI specification can define interfaces for hardware management. Moreover, IPMI can provide an interface to a computing system that may be otherwise unavailable by establishing a network connection with a BMC or another independent service controller.

According to some embodiments, a BMC can emulate the functions of the LED pattern monitor for the hot-pluggable device. Additionally, a BMC can emulate the functions of an interrupt signal controller. According to some embodiments, a BMC can streamline hardware designs and reduce manufacturing costs.

According to some embodiments, a work mode of a LED power indicator (on/off/blinking) can be determined by the LED pattern monitor or the BMC using one or more LED pattern logics as described herein.

According to some embodiments, the present technology can add or remove a device using a hot-add sequence or a hot-remove sequence as disclosed herein.

FIG. 1 illustrates an overall system diagram including a server rack with various PICe devices, according to some embodiments. It should be appreciated that the topology in FIG. 1 is an example, and any numbers of racks, switches and network components may be included in the system of FIG. 1.

A network system can include a large number of racks that are connected by various network interfaces. For example, the system can include Rack 102 that holds multiple server boxes (e.g., Server Box 104), each of which can host a group of servers or nodes (e.g., Node 108). According to their respective functions, these nodes can be storage nodes or computing nodes, or a combination of the two. These nodes can host different client applications, such as email or web applications. Further, these nodes can transmit data via layers of switch fabrics that are built into the rack's architecture. For example, an Integrated Switch 106 can be built into a Server Box 104 and provide network functions to a group of nodes (e.g., Node 108). Additionally, Server Box 104 can be a network switch box, a storage box, or a computing box.

According to some embodiments, the present technology can enable PCIe data transmission for intra-rack network trafficking. As a standard for computer expansion cards, PCIe can connect peripheral devices to a computing device via a high-speed link. Usually, a connection between any two PCIe devices is known as a link, and can comprise one or more lanes. Because PCIe enables point-to-point serial links, it can provide advantages of high-speed data transmission over Ethernet transmission. For example, PCIe data transmission can reach over 30 GB/s for a 16-lane slot PCIe device. Additionally, other high-speed data transmission protocols can be used for intra-rack network trafficking according to embodiments of the present technology.

According to some embodiments, intra-rack data communications are transmitted via a high-speed PCIe bus. A PCIe bus includes PCIe slots into which the PCIe expansion cards or PCIe adaptors of the peripheral devices can be inserted or removed. The PCIe bus can include other standard elements for hot-plug technology, including, without limiting to, a LED Power Indicator, a LED Attention Indicator, a MRL, a MRL Sensor, an Attention Button, a Software User Interface, or Slot Numbering.

For example, a Power Indicator can visually indicate the power state, e.g. on/off/transitioning, of the slot or card. According to some embodiments, a Power Indicator can be a LED light in a selected color, such as green. Additionally, the Power Indicator can be a switch power LED or a node power LED.

An Attention Indicator can indicate the slot/card for hot-plug operation. According to some embodiments, an Attention Indicator can be a LED light in another selected color, such as yellow.

A Manually-operated Retention Latch (MRL) can lock the plug-in device or cards in place. A MRL Sensor can allow the port and system software to detect the MRL being opened. An Attention Button can allow a user to request hot-plug operations, such as inserting or removing a device, by pushing a physical button.

A Software User Interface can allow a user to request hot-plug operations by interacting with a computer interface. In addition, Slot Numbering, as defined by PCI-SGI, can provide visual identification of slots to prevent inadvertent human errors such as removing an undesired node.

Further, Presence Detect can be implemented using in-band or using presence detect pins. Presence Detect technology is well known by those skilled in the art so that further description thereof is unnecessary.

Figure 2:
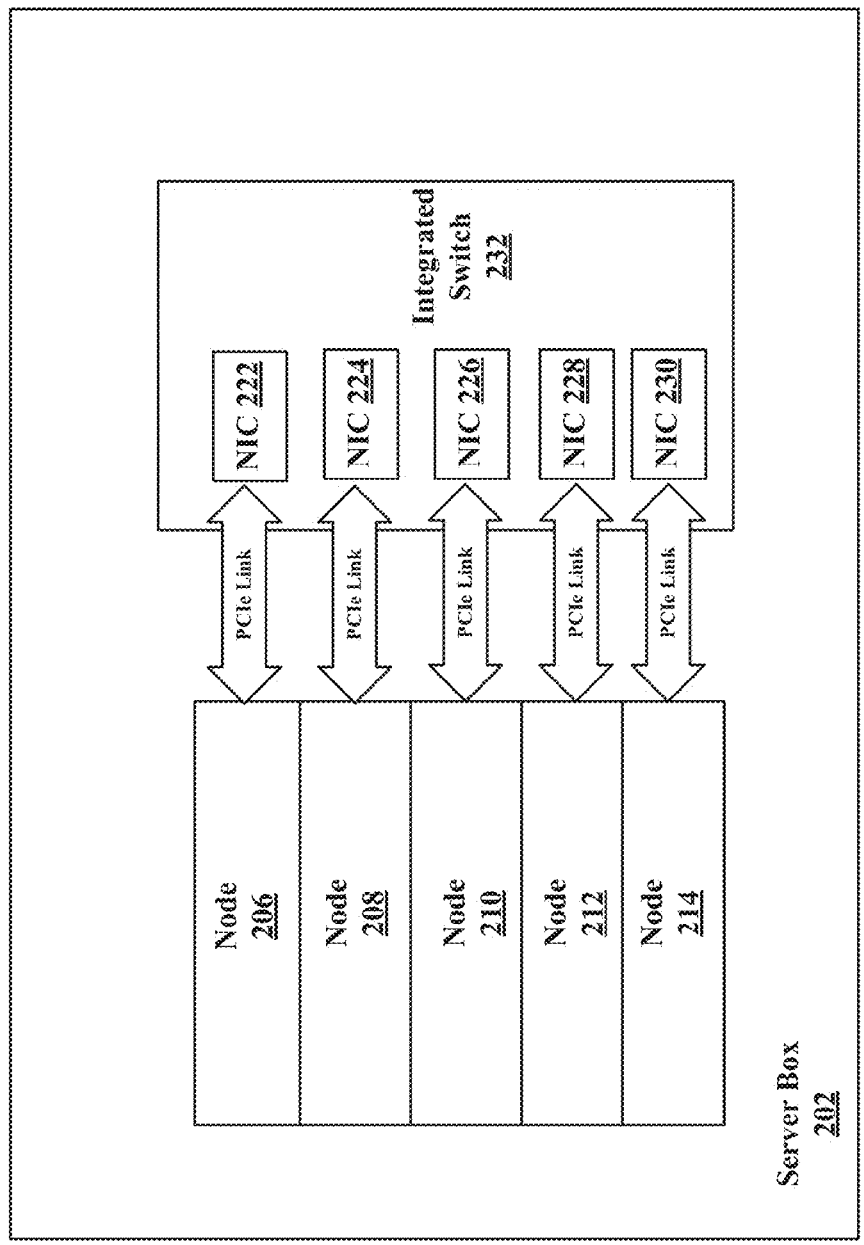
FIG. 2 is a schematic block diagram illustrating an example of a PCIe switch coupled to a plurality of PCIe nodes, according to some embodiments.

FIG. 2 is a schematic block diagram illustrating an example of a PCIe switch coupled to a plurality of PCIe nodes, according to some embodiments. Fox example, Server Box 202 can comprise a group of nodes (e.g., Node 206, Node 208, Node 210, Node 212 and Node 214), each of which is respectively associated with a NIC (e.g., NIC 222, NIC 224, NIC 226, NIC 228, and NIC 230). These NICs can be embedded in an Integrated Switch 232. These nodes can be electrically connected to the NICs by PCIe links as shown in FIG. 2. Such a decoupled NIC design can utilize the high-bandwidth and low-latency of the PCIe protocol for intra-rack data transmission.

One aspect of the present technology can provide hardware or software specifications for hot-plug operations between, for example, one switch and multiple nodes, as set forth in the following specification.

Figure 3A:
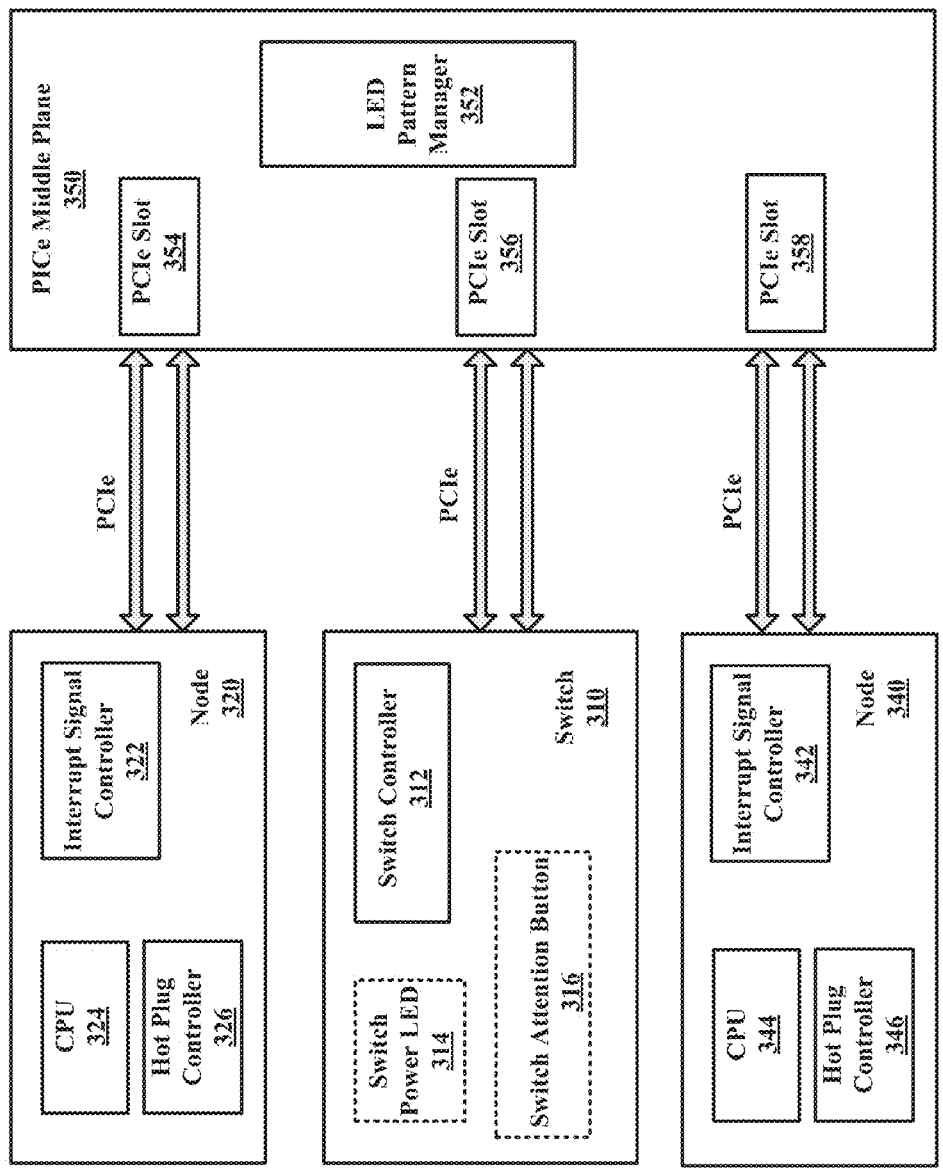
FIG. 3A is a schematic block diagram illustrating an example of a hot-plug PCIe system supporting switch hot-plug functions, according to some embodiments.

FIG. 3A is a schematic block diagram illustrating an example of a hot-plug PCIe system supporting switch hot-plug functions, according to some embodiments.

For example, according to some embodiments, a network switch (e.g., Switch 310) can be connected with one or more nodes (e.g., Node 320 and Node 340) using a switch hot-add sequence as disclosed herein. The switch can be an integrated switch that is connected to the group of nodes in a server box of a rack, using a PCIe system bus. According to some embodiments, the switch can include a group of NICs (not shown), each of which can be assigned to one node.

Switch 310 can be associated with, for example, a Switch Power LED 314 for indicating an operational state of Switch 310, e.g., a transitional state, a power-on state or a power-off state. Alternatively, Switch Power LED 314 can be associated with PCIe Slot 356 for indicating a corresponding operational state of PCIe Slot 356. Switch 310 can further be associated with, for example, a Switch Attention Button 316 that can receive a user's input for initiating the hot-add sequence. Switch Attention button 316 can alternatively be associated with PCIe Slot 356. Additionally, instead of a physical button, a user interface rendered by a computer can be used to receive a user's input for initiating the hot-add sequence. According to some embodiments, the switch hot-add sequence can comprise, but not limited to, the following steps:

Initially, a user can insert Switch 310 to an unpowered PCIe slot (e.g., 356) in a server box. The newly added switch can comprise multiple embedded NICs for Node 320 and Node 340. According to some embodiments, Present Detect (not shown) can send signals to indicate a device being added in PCIe slot 356.

Next, the user can press Switch Attention Button 316 to initiate the hot add sequence. Switch Attention Button 316 can send a hot-add signal to other nodes using a PCIe bus.

Meanwhile, Switch Power LED 314 can blink or flash during a transitional state before the switch is fully configured or recognized by the system.

Upon receiving the hot-add signal, Interrupt Signal Controller 322 of Node 320 can, for example, transmit the signal to Hot Plug Controller 322 that is associated with CPU 324 for enabling the hot-add function. An example of Interrupt Signal Controller 322 can be an I/O expander, such as PCA9559. Interrupt Signal Controller 322 can generate hot-add interrupt signals. According to some embodiments, Hot Plug Controller 326 can control the power of Node 320 as well as PCIe Slot 354. Further, a hot plug driver (not shown) can load a corresponding driver for Switch 310.

Additionally, Switch Controller 312, upon detecting Switch 310 been inserted into PCIe Slot 356, can send signals to a power supply unit (not shown) to provide a power supply to PCIe Slot 356. Through the hot-add sequence, the newly added Switch 310 is identified and configured to operate properly with the corresponding nodes (e.g., Node 320 and Node 340). With the hot-add sequence successfully completed, Switch Power LED 314 can be turned on to indicate a operational state of the switch.

According to some embodiments, the present technology can remove a network switch (e.g., 310) that is in communication with one or more nodes (e.g., Node 320 and Node 340) using a switch hot-remove sequence as discussed herein.

For example, a user can press Switch Attention Button 316 for requesting a hot removal. Alternatively, the user can select a corresponding hot-removal option on a user interface displayed on a computing device. Switch Attention Button 316 can accordingly send a hot-removal signal to all related devices (e.g. powered PICe slot 356, 354 and 358, Node 320 and 340), for requesting the related devices to be disconnected from Switch 310. For example, Interrupt Signal Controller 342 of Node 340 can receive the hot-removal signal and generate interrupt signals for Node 340. The interrupt signals can be transmitted to a Hot Plug Controller 346 that is associated with CPU 344 of Node 340.

Consequently, upon receiving the interrupt signals, Hot Plug Controller 346 can communicate a hot-removal request to a hot plug driver to unload the driver for Switch 310. Meanwhile, a switch power LED can blink to indicate a transition state of the switch. Operation system (OS) of all devices related to Switch 310 can be offlined, in preparation for the hot remove.

Further, Hot Plug Controller 346 can, for example, turn off power to Node 340. According to some embodiments, Switch 310 is appropriate to be removed after Switch Power LED 314 is turned off. The work mode (e.g., on/off/blinking) of Switch Power LED 314 can be determined by a LED Pattern Manager 352, using LED pattern logics as disclosed herein. LED Pattern Manager 352 can be associated with a PCIe Middle Plane 350.

LED Pattern Manager 352 can manage LED patterns for hot-pluggable devices, including switches, computing nodes or storage nodes. LED Pattern Manager 352 can be a microprocessor that can control a work mode (e.g., on/off/blinking) of the LED by implementing one or more LED pattern logics. According to some embodiments, LED Pattern Manager 352 can synchronize various input signals and generate a single output signal for indicating whether a hot add sequence is completed or a hot remove sequence is appropriate. The single output signal can operate a power indicator of a specific device, such as a power indicator LED, for indicating whether the specific device is successfully added to the system or whether it is appropriate to remove the device. The power indicator (e.g. Switch Power LED 314), in corresponding to an operational state of the service device, can operate in one of the three work mode: blinking, turn-on and turn-off.

After the user opens the MRL and removes the switch, Presence Detect can toggle to indicate that Switch PCIe Slot 356 is empty.

Figure 3B:
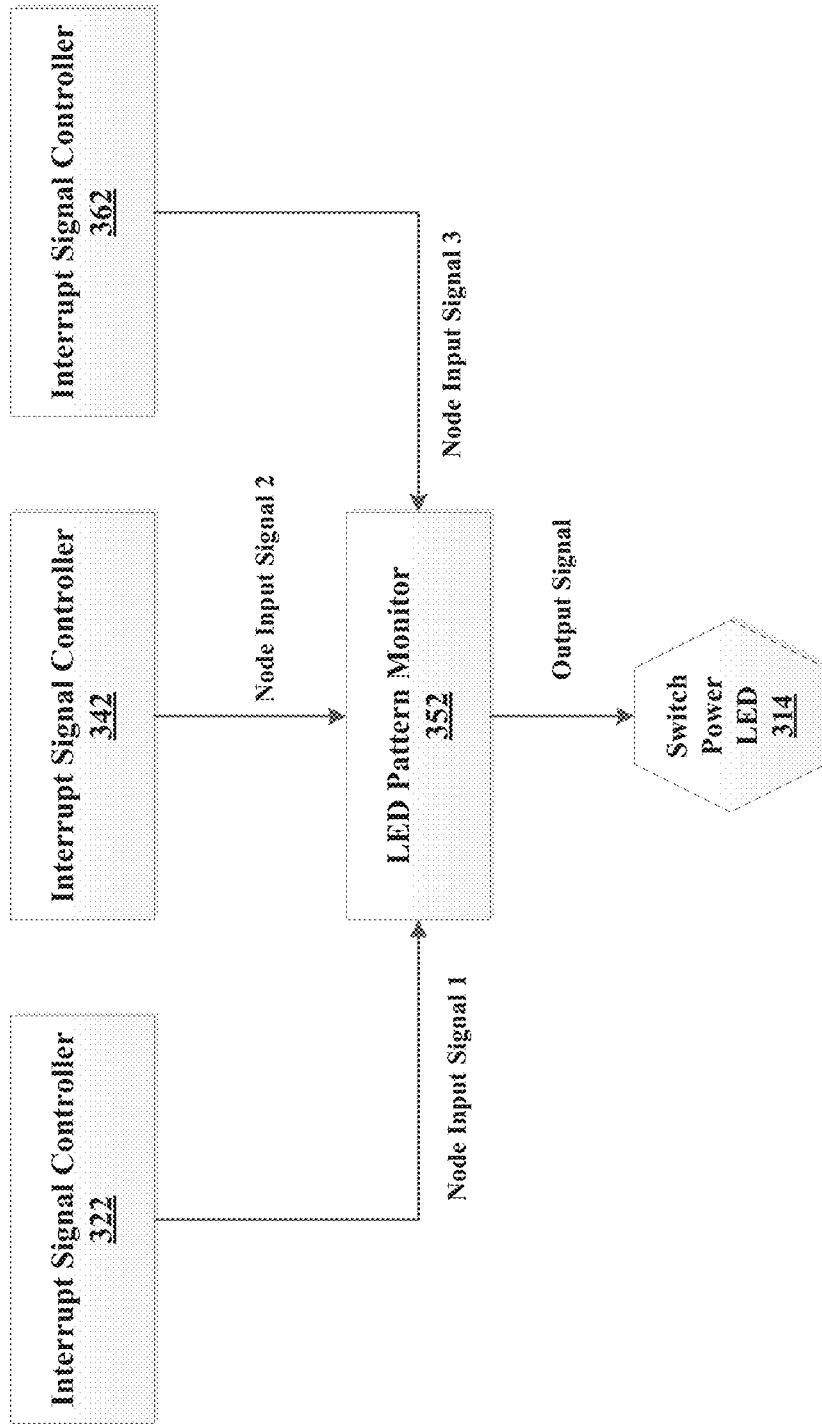
FIG. 3B is an example flow diagram for the hot-plug PICe system supporting switch hot-plug functions, according to some embodiments.

FIG. 3B is an example flow diagram for determining a work mode of the power indicator using one or more LED pattern logics, according to some embodiments. For example, a work mode of Switch Power LED 314 (on/off/blinking) can be determined by LED Pattern Monitor 352 using the following LED pattern logics.

According to some embodiments, if at least one node input signal (Node Input Signal 1, 2 and 3) generated by Interrupt Signal Controller 322, 342 or 362 is "blinking" (indicating a transitioning state of a node), LED Pattern Monitor 352 can generate a Blinking Output signal for Switch Power LED 314. For a hot-add operation, the Blinking Output signal can indicate that at least one node is not ready after connecting Switch 310 to the system; for a hot-remove operation, the Blinking Output signal can indicate that at least one node is not ready for Switch 310 to be removed.

According to some embodiments, if none of the node input signals is "blinking", but at least one input signal is "on", LED Pattern Monitor 352 can generate an On Output signal for Switch Power LED 314. For a hot-add operation, the On Output signal can indicate that Switch 310 has been successfully added to the system; for a hot-remove operation, the On Output signal can indicate that at least one node is not ready for Switch 310 to be removed.

According to some embodiments, if all node input signals are "off", LED Pattern Monitor 352 can generate an Off Output signal for Switch Power LED 314. For a hot-add operation, the Off Output signal can indicate that the nodes are not ready after connecting Switch 310 to the system; for a hot-remove operation, the Off Output signal can indicate that Switch 310 is ready to be removed.

Figure 4:
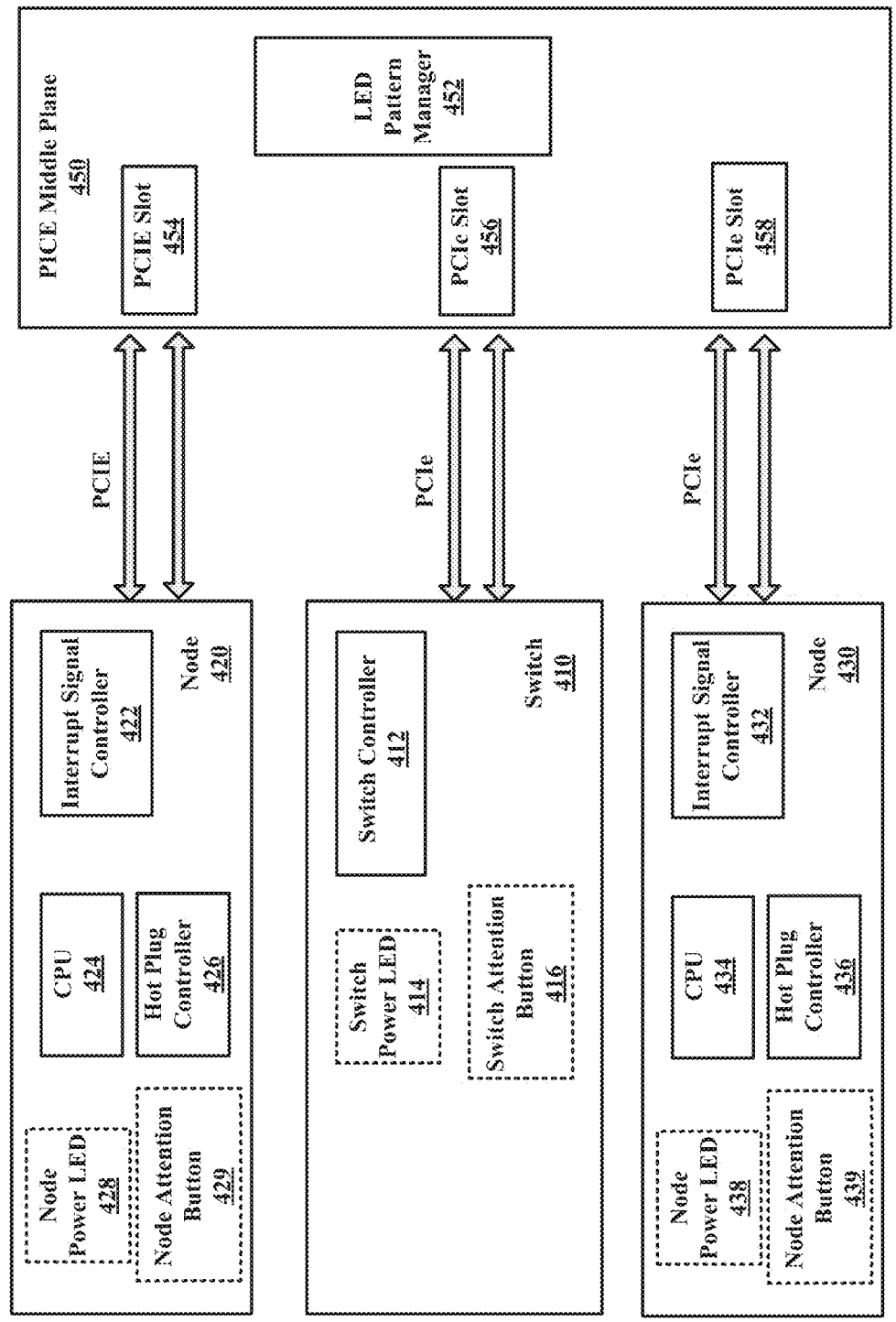
FIG. 4 is a schematic block diagram illustrating an example of a hot-plug PCIe system supporting node hot-plug functions, according to some embodiments.

FIG. 4 is a schematic block diagram illustrating an example of a hot-plug PCIe system supporting node hot-plug functions, according to some embodiments.

According to some embodiments, aspects of the present technology include inserting a node (e.g., Node 420 or 430) to couple with an integrated switch (e.g., Switch 410) using a node hot-add sequence as disclosed herein. Additionally, a node can be a compute node or a storage node. According to some embodiments, the integrated switch can include a group of NICs (not shown), each of which is assigned to one node.

Switch 410 can be associated with, for example, a Switch Power LED 414 for indicating an operational state of Switch 410, e.g., a transitional state, a power-on state or a power-off state. Alternatively, Switch Power LED 414 can be associated with PCIe Slot 456 for indicating a corresponding operational state of PCIe Slot 456. Switch 410 can further be associated with, for example, a Switch Attention Button 416 that can receive a user's input for initiating the hot-add sequence. Switch Attention button 416 can alternatively be associated with PCIe Slot 456. Additionally, instead of a physical button, a user interface rendered by a computer can be used to receive a user's input for initiating the hot-add sequence. According to some embodiments, the node hot-add sequence can comprise, but not limited to, the following steps:

A user can insert Node 420 to an unpowered PCIe Slot 454 in a server box. The newly added node is configured to communicate with Switch 410 using PCIe links. Present Detect can toggle to indicate a device being added in PCIe slot 454.

Next, the user can press Node Attention Button 429 initiate the hot add sequence. Node Attention Button 429 can send a hot-add signal to other devices using PCIe bus. A Node Power LED 428 can blink during a transitional state of the node insertion.

Meanwhile, Node Attention Button 429 can send hot-add signals to Switch 410 for activating the network interface (e.g., NIC) of the node. For example, Switch Controller 412 can receive the hot-add signals and generate commands to configure and activate the corresponding NIC. Using the hot-add sequence, the newly added node is identified and configured to utilize the NIC embedded in the switch.

Further, upon receiving the hot-add signal, Interrupt Signal Controller 422 of Node 420 can, for example, transmit the signal to Hot Plug Controller 426 that is associated with CPU 424 for enabling the hot-add function. An example of Interrupt Signal Controller 422 can be an I/O expander, such as PCA9559, for generating hot-add interrupt signals. According to some embodiments, Hot Plug Controller 426 can control the power of Node 420 as well as PCIe Slot 454. Further, a hot plug driver (not shown) can load a corresponding driver for Switch 410. With the hot add sequence completed, Node Power LED 428 can be turned on to indicate a normal operational state.

According to some embodiments, the present technology can remove a node (e.g., Node 420 or Node 430) that is in communication with an integrated switch (e.g. 410) using a node hot-remove sequence as discussed herein.

For example, a user can press Node Attention Button 439 for requesting a hot removal. Alternatively, the user can select a corresponding hot-removal option on a user interface displayed on a computing device. Node Attention Button 439 can accordingly send a hot-removal signal to all related devices (e.g. powered PICE slot 458, 456 and 454), for requesting the related devices to be disconnected from Node 430. For example, Interrupt Signal Controller 432 of Node 430 can receive the hot-removal signal and generate interrupt signals for Node 430. The interrupt signals can be transmitted to a Hot Plug Controller 436 that is associated with CPU 434.

Consequently, upon receiving the interrupt signals, Hot Plug Controller 436 can communicate a hot-removal request to a hot plug driver to unload the driver for node 430. Meanwhile, a Node Power LED 438 can blink to indicate a transition state of the node. Operation system (OS) of all devices related to Node 430 can be offlined, in preparation for the hot remove.

Further, Hot Plug Controller 436 can, for example, turn off power to Node 430. According to some embodiments, Node 430 is appropriate to be removed after Node Power LED 438 is turned off. The work mode (e.g., on/off/blinking) of Node Power LED 438 can be determined by a LED Pattern Manager 432, using LED pattern logics as disclosed herein. LED Pattern Manager 453 can be associated with a PCIe Middle Plane 450.

LED Pattern Manager 452 can manage LED patterns for hot-pluggable devices, including switches, computing nodes or storage nodes. LED Pattern Manager 452 can be a microprocessor that can control a work mode (e.g., on/off/blinking) of the LED by implementing one or more LED pattern logics. According to some embodiments, LED Pattern Manager 452 can synchronize various input signals and generate a single output signal for indicating whether a hot add sequence is completed or a hot remove sequence is completed. The single output signal can operate a power indicator of a specific device, such as a power indicator LED, for indicating whether the specific device is successfully added to the system or whether it is appropriate to remove the device. The power indicator (e.g. Node Power LED 438), in corresponding to an operational state of the service device, can function in one of the three work modes: blinking, turn-on and turn-off.

Finally, after the user opens the MRL and removes the switch, Presence Detect can toggle to indicate that PCIe Slot 458 is empty.

Figure 5A:
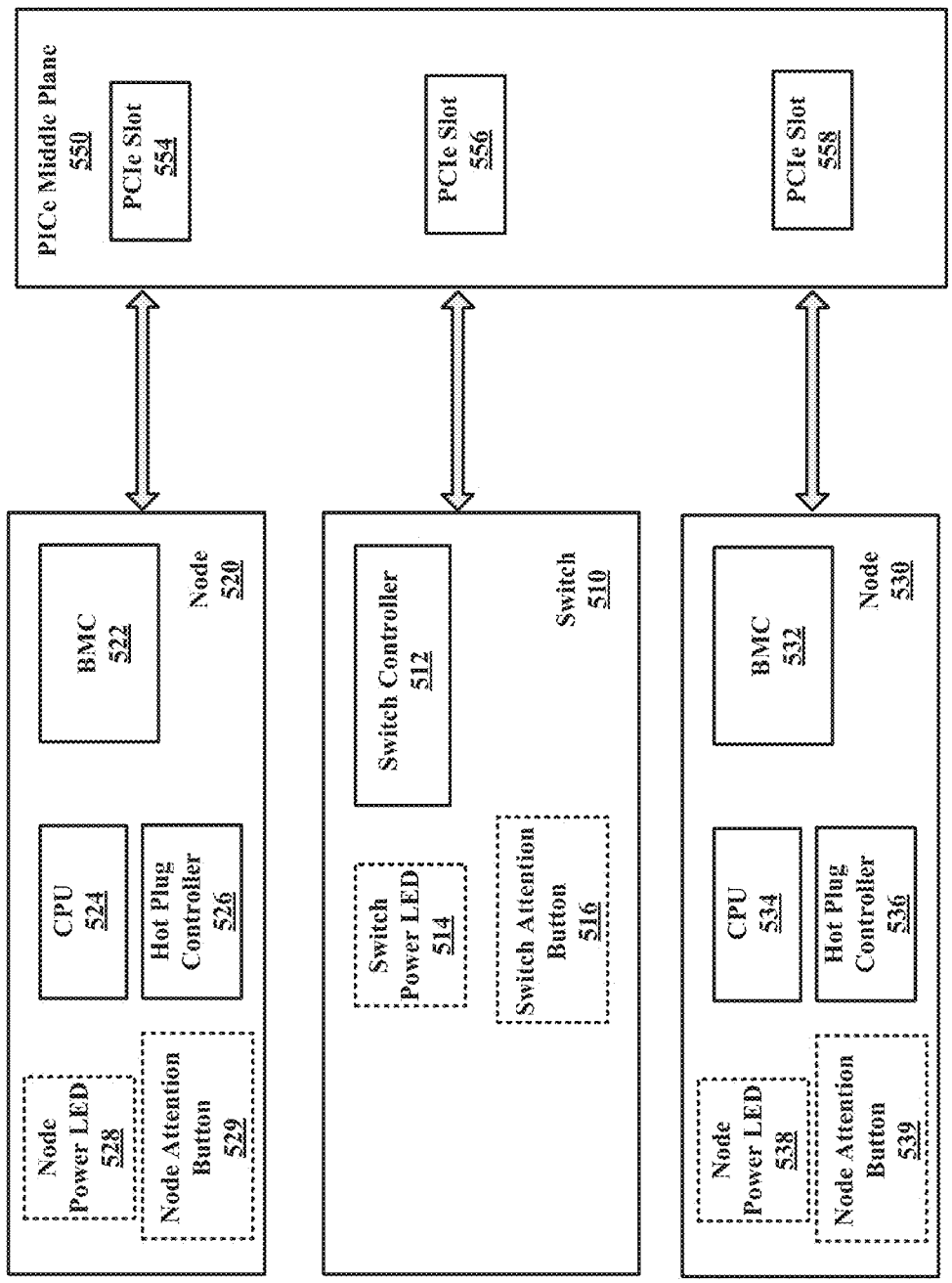
FIG. 5A is a schematic block diagram illustrating an example of a hot-plug PCIe system with one or more service controllers, according to some embodiments.

FIG. 5A is a schematic block diagram illustrating an example of a hot-plug PCIe system with one or more service controllers, according to some embodiments. According to some embodiments, the present technology can enable a service controller to emulate the function of an Interrupt Signal Controller, such as a PCA9559. The advantages of utilizing the service controller include simplifying the hot-plug control signals as well as reducing hardware manufacturing costs. An example of a service controller is a BMC.

A BMC is an independent and embedded microcontroller that, in some embodiments, is responsible for the management and monitoring of the main CPU, firmware and operating system. A BMC can manage peripheral devices, e.g. switches, computing nodes and storage nodes via Intelligent Platform Management Interface (IPMI) specification. The IPMI specification can define interfaces for hardware management. According to some embodiments, a BMC can emulate control signals of an interrupt signal controller using an I2C bus, thus simplifying the necessary hot-plug signals.

According to some embodiments, the present technology can enable inserting a node (e.g., Node 520 or 530) to couple with an integrated switch (e.g., Switch 510) using a node hot-add sequence as disclosed herein. According to some embodiments, the integrated switch can include a group of NICs (not shown), each of which is assigned to one node.

Switch 510 can be associated with, for example, a Switch Power LED 514 for indicating an operational state of Switch 510, e.g., a transitional state, a power-on state or a power-off state. Switch 510 can further be associated with, for example, a Switch Attention Button 516 that can receive a user's input for initiating the hot-add sequence. Switch Attention button 516 can alternatively be associated with PCIe Slot 556. Additionally, instead of a physical button, a user interface rendered by a computer can be used to receive a user's input for initiating the hot-add sequence. Switch 510 can further comprise a Switch Power LED 514 and a Switch Controller 512. According to some embodiments, the node hot-add sequence can comprise, but not limited to, the following steps:

A user can insert Node 520 to an unpowered PCIe Slot 554 in a server box. PCIe Slot 554, along with other PCIe slots, can be associated with a PCIe Middle Plane 550. The newly added node is configured to communicate with switch 510 using PCIe links. Present Detect can toggle to indicate a device being added in PCIe slot 554.

Next, the user can press Node Attention Button 529 to initiate the hot add sequence. Node Attention Button 529 can send a hot-add signal to other devices. A Node Power LED 528 can blink during a transitional state of the node insertion.

Meanwhile, Node Attention Button 529 can send hot-add signals to Switch 510 for activating the network interface (e.g., NIC) of the node. For example, Switch Controller 512 can receive the hot-add signals and generate commands to configure and activate the corresponding NIC. Using the hot-add sequence, the newly added node is identified and configured to utilize the NIC embedded in the switch.

Further, upon receiving the hot-add signal, BMC 522 of Node 520 can, for example, transmit the signal to Hot Plug Controller 526 by an I2C bus. Hot Plug Controller 526 can be associated with CPU 524 for enabling the hot-add function. According to some embodiments, Hot Plug Controller 526 can control the power of Node 520 as well as PCIe Slot 554. With the hot add sequence completed, Node Power LED 528 can be turned on to indicate a normal operational state. Additionally, in addition to using a BMC, other service controllers that can perform the functions of BMC 522 can be utilized pursuant to specifications disclosed herein.

According to some embodiments, the present technology can remove a node (e.g., Node 520 or Node 530) that is in communication with an integrated switch (e.g. 510) using a node hot-remove sequence as discussed herein.

For example, a user can press Node Attention Button 539 for requesting a hot removal. Node Attention Button 539 can send a hot-removal signal to all related devices (e.g. powered PICE slot 558), for requesting the related devices to be disconnected from Node 530. For example, BMC 532 of Node 530 can receive the hot-removal signal and generate interrupt signals for Node 530. The interrupt signals can be transmitted to a Hot Plug Controller5 that is associated with CPU 534.

Consequently, upon receiving the interrupt signals, Hot Plug Controller 536 can communicate a hot-removal request to a hot plug driver to unload the driver for node 530. Meanwhile, a Node Power LED 538 can blink to indicate a transition state of the node. Operation system (OS) of all devices related to Node 530 can be offlined, in preparation for the hot remove.

Further, Hot Plug Controller 536 can, for example, turn off power to Node 530 as well as PICE Slot 558. According to some embodiments, Node 530 is appropriate to be removed after Node Power LED 538 is turned off. The work mode (e.g., on/off/blinking) of Node Power LED 538 can be determined by BMC 532, using LED pattern logics as disclosed herein.

BMC 532 can manage LED patterns for hot-pluggable devices, including switches, computing nodes or storage nodes. BMC 532 can control work mode (e.g., on/off/blinking) of the LED by implementing one or more LED pattern logics. According to some embodiments, BMC 532 can synchronize various input signals and generate a single output signal for indicating whether a hot add sequence is completed or a hot remove sequence is completed. A power indicator of a specific device can indicate whether the specific device is successfully added to the system or whether it is appropriate to remove the device. For example, Node Power LED 538, in corresponding to one of a transitioning state, a power-on state or a power-off state of the service device, can function in one of the three work mode: blinking, turn-on and turn-off.

According to some embodiments, the present technology can add or remove a switch (e.g., Switch 510) to the system, using a switch hot-add sequence or a switch hot-remove sequence as discussed herein.

Figure 5B:
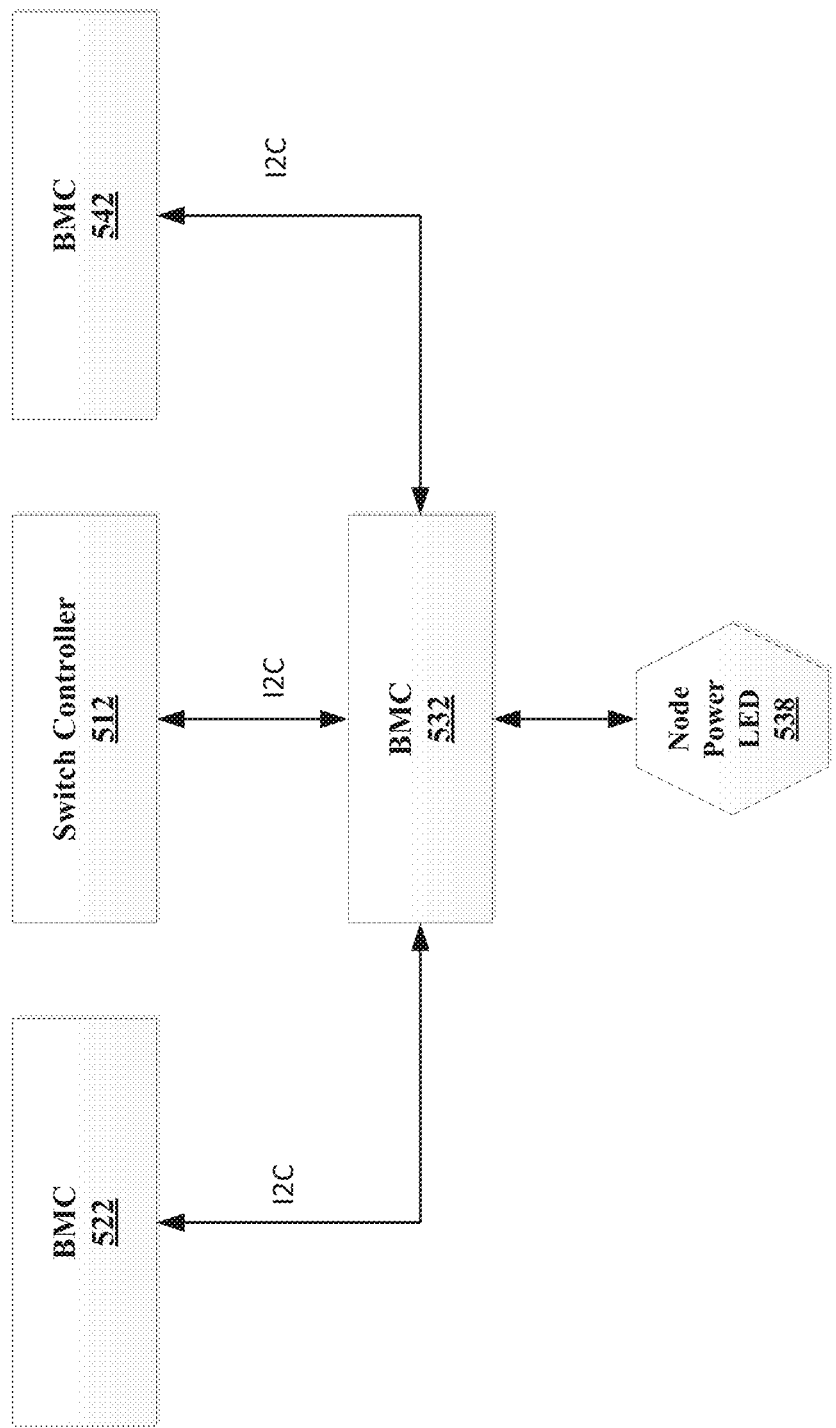
FIG. 5B is an example flow diagram for the hot-plug PICe system with one or more service controllers, according to some embodiments.

FIG. 5B is an example flow diagram for determining a work mode of the power indicator using one or more LED pattern logics, according to some embodiments. For example, a work mode of Node Power LED 538 (on/off/blinking) can be determined by BMC 532 using the following LED pattern logics. Additionally, in addition to using a BMC, other service controllers that can perform the functions of BMC 522 can be utilized pursuant to specifications disclosed herein.

According to some embodiments, if at least one input signal generated by BMC 522, Switch Controller 512, or BMC 542 is "blinking" (indicating a transitioning state of a node or a switch), BMC 532 can generate a Blinking Output signal for Node Power LED 538. For a hot-add operation, the Blinking Output signal can indicate that at least one device is not ready after connecting Node 530 to the system; for a hot-remove operation, the Blinking Output signal can indicate that at least one node is not ready for Node 530 to be removed.

According to some embodiments, if none of the node input signals is "blinking", but at least one input signal is "on", BMC 532 can generate an On Output signal for Node Power LED 538. For a hot-add operation, the On Output signal can indicate that Node 530 has been successfully added to the system; for a hot-remove operation, the On Output signal can indicate that at least one device is not ready for Node 530 to be removed.

According to some embodiments, if all node input signals are "off", BMC 532 can generate an Off Output signal for Node Power LED 538. For a hot-add operation, the Off Output signal can indicate that Node 532 has not been connected to system; for a hot-remove operation, the Off Output signal can indicate that Node 530 is ready to be removed.

Figure 6:
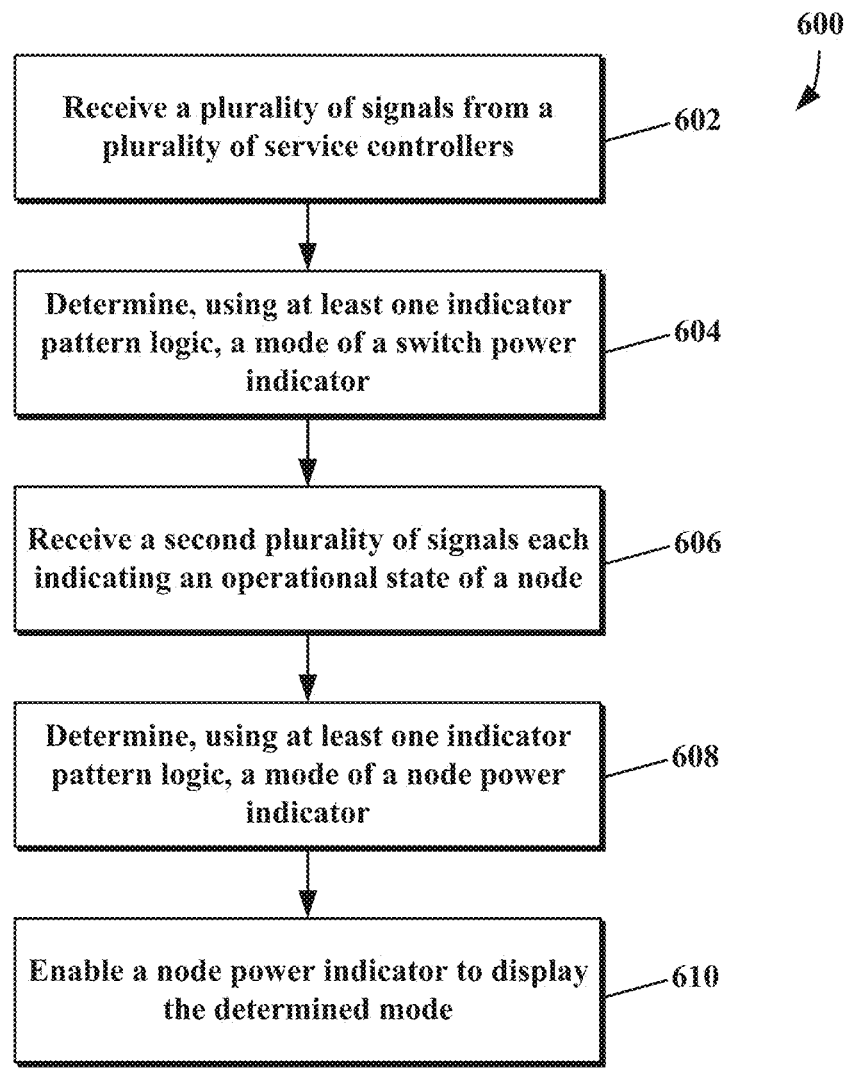
FIG. 6 is an example flow diagram for a hot-plug PCIe system, according to some embodiments.

FIG. 6 is an example flow diagram for a hot-plug PCIe system, according to some embodiments. It should be understood that there can be additional, fewer, or alternative steps performed in similar or alternative orders, or in parallel, within the scope of the various embodiments unless otherwise stated.

At step 602, a switch controller can receive a plurality of signals from a plurality of service controllers of a plurality of PCIe devices within a hot-pluggable computing system. Each of the signals can indicate an operational state of the PCIe device. For example, in a hot-removal sequence, an integrated switch can receive a plurality of hot-plug signals generated by a group of BMCs, each of the BMCs being associated with a node within a server box.

At step 604, the switch controller can determine a work mode of a switch power indicator, using indicator pattern logic as disclosed herein. For example, the work mode can be one of a blinking mode, a power-on mode or a power-off mode for indicating whether a hot-add sequence or a hot-remove sequence is completed. Additionally, the switch controller can enable the switch power indicator to display the determined work mode. For example, the switch power indicator can flash to indicate that the hot-add sequence or the hot-remove sequence is not completed.

At step 606, a service controller of a node can receive a group of signals, each of the signals indicating an operational state of another device. For example, a BMC of a node can receive a group of hot-plug signals generated by other BMCs of other nodes within a system.

At step 608, the service controller can determine a work mode of a node power indicator, using at least one indicator power logic. For example, the indicator power logic can determine the work node by synchronizing several input signals and generating a single output signal.

At step 610, the service controller can enable the node power indicator to display the determined work mode. For example, the BMC of the node can control the node power indicator to flash for indicating that either the hot-add sequence or the hot-remove sequence is not completed.

Figure 7:
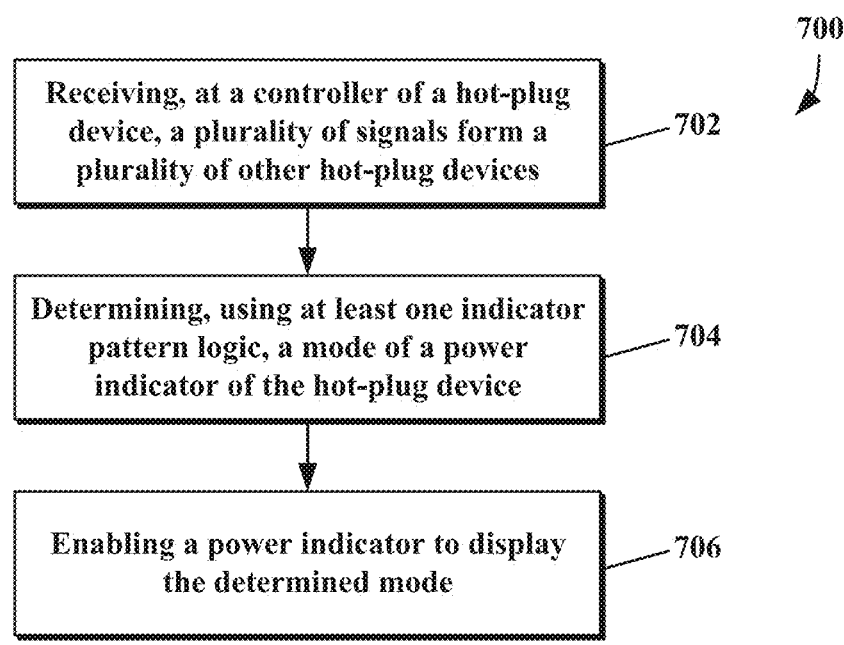
FIG. 7 is another example flow diagram for a hot-plug PCIe system, according to some embodiments.

FIG. 7 is another example flow diagram for a hot-plug PCIe system, according to some embodiments. It should be understood that there can be additional, fewer, or alternative steps performed in similar or alternative orders, or in parallel, within the scope of the various embodiments unless otherwise stated.

At step 702, a controller can receive a plurality of signals from a plurality of other hot-plug devices. For example, a switch controller of a switch can receive a group of hot-plug signals generated by a group of BMCs associated with a group of nodes.

At step 704, the controller can determine a work mode of a power indicator, using at least one indicator pattern logic. For example, the switch controller can synchronize the group of hot-plug signals and generate a single output signal for the power indicator.

At step 706, the controller can enable the power indicator to display the determined work mode. For example, a power indicator of the switch can flash to indicate that a hot-add sequence or a hot-remove sequence is not completed.

Figure 8:
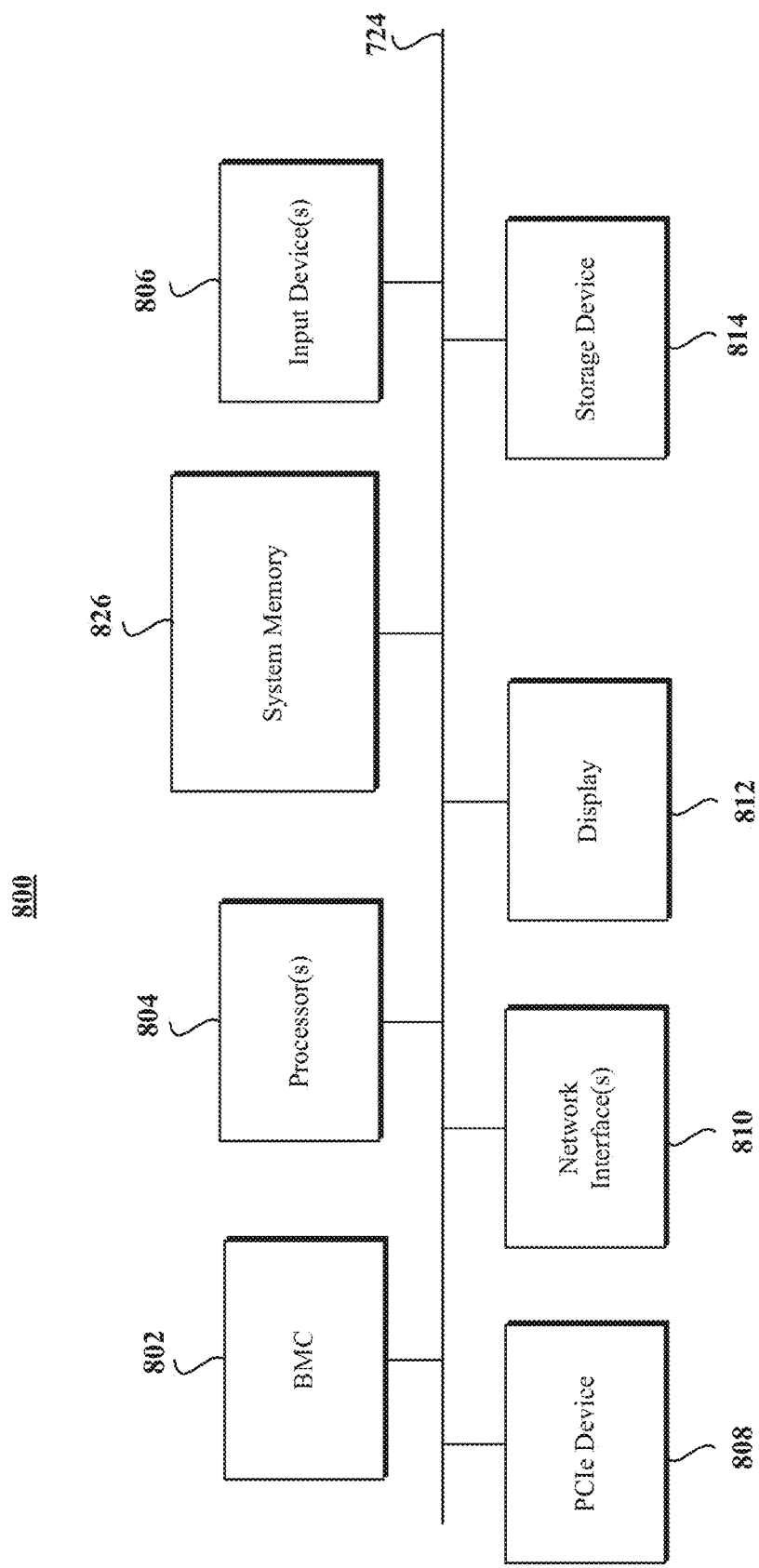
FIG. 8 illustrates a computing platform of a computing device, according to some embodiments.

FIG. 8 illustrates an example system architecture 800 for implementing the systems and processes of FIGS. 1-7. Computing platform 800 includes a bus 824 which interconnects subsystems and devices, such as: BMC 802, processor 804, storage device 814, system memory 826, a network interface(s) 810, and PCIe Device 808. Processor 804 can be implemented with one or more central processing units ("CPUs"), such as those manufactured by Intel® Corporation—or one or more virtual processors—as well as any combination of CPUs and virtual processors. Computing platform 800 exchanges data representing inputs and outputs via input-and-output devices input devices 806 and display 812, including, but not limited to: keyboards, mice, audio inputs (e.g., speech-to-text devices), user interfaces, displays, monitors, cursors, touch-sensitive displays, LCD or LED displays, and other I/O-related devices.

According to some examples, computing architecture 800 performs specific operations by processor 804, executing one or more sequences of one or more instructions stored in system memory 826. Computing platform 800 can be implemented as a server device or client device in a client-server arrangement, peer-to-peer arrangement, or as any mobile computing device, including smart phones and the like. Such instructions or data may be read into system memory 826 from another computer readable medium, such as storage device 814. In some examples, hard-wired circuitry may be used in place of or in combination with software instructions for implementation. Instructions may be embedded in software or firmware. The term "computer readable medium" refers to any tangible medium that participates in providing instructions to processor 804 for execution. Such a medium may take many forms, including, but not limited to, non-volatile media and volatile media. Non-volatile media includes, for example, optical or magnetic disks and the like. Volatile media includes dynamic memory, such as system memory 826.

Common forms of computer readable media includes, for example: floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 824 for transmitting a computer data signal.

In the example shown, system memory 826 can include various modules that include executable instructions to implement functionalities described herein. In the example shown, system memory 826 includes a log manager, a log buffer, or a log repository—each can be configured to provide one or more functions described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A hot-pluggable computing system, comprising:
   a plurality of nodes, the plurality of nodes being associated with a plurality of service controllers each configured to generate a signal indicating an operational state of a node of the plurality of nodes;
   a hot-swappable switch in communication with the plurality of nodes, the hot-swappable switch being associated with a switch controller configured to at least manage a switch power indicator;
   at least one processor; and
   memory including instructions that, when executed by the at least one processor, causes the hot-pluggable computing system to:
   receive, at the switch controller, a plurality of signals from the plurality of service controllers, each of the plurality of signals indicating an operational state of one of the plurality of nodes;
   determine, using at least one indicator pattern logic, a work mode of the switch power indicator based at least in part on the plurality of signals; and
   enable the switch power indicator to display the determined work mode.

2. The hot-pluggable computing system of claim 1, further comprising instructions that, when executed by the at least one processor, causes the hot-pluggable computing system to:
   receive, at a first service controller of a first node of the plurality of nodes, a second plurality of signals each indicating an operational state of another node of the plurality of nodes or the hot-swappable switch;
   determine, using at least one indicator pattern logic, a work mode of a first node power indicator based at least in part on the second plurality of signals; and
   enable the first node power indicator to display the determined work mode.

3. The hot-pluggable computing system of claim 1, further comprising instructions that, when executed by the at least one processor, causes the hot-pluggable computing system to:
   transmit a hot-remove request of disconnecting the hot-swappable switch to the plurality of service controllers; and
   enable a power supply unit to terminate a power supply to the hot-swappable switch.

4. The hot-pluggable computing system of claim 1, wherein the determined work mode indicates a progress of one of a hot-add sequence or a hot-remove sequence.

5. The hot-pluggable computing system of claim 1, wherein each node of the plurality of node is associated with a node power indicator, the node power indicator configured to indicate an operational state of the node including one of a transition state, a power-on state or a power-off state.

6. The hot-pluggable computing system of claim 1, wherein the hot-swappable switch comprises a plurality of network interface controllers, each of the plurality of network interface controllers configured to be associated with a node of the plurality of nodes.

7. The hot-pluggable computing system of claim 1, wherein the determined work mode of the switch power indicator comprises one of a blinking mode, a power-on mode or a power-off node.

8. The hot-pluggable computing system of claim 5, wherein the node power indicator comprises a node power LED, the switch power indicator comprises a switch power LED, and the at least one indicator pattern logic comprises a LED pattern logic.

9. The hot-pluggable computing system of claim 1, wherein the plurality of service controllers are configured to transmit the plurality of signals using an I2C bus.

10. A computer-implemented method, comprising:
receiving, at a controller of a hot-swappable switch, a plurality of signals from a plurality of hot-plug devices in communication with the hot-swappable switch, the plurality of signals configured to be generated by a plurality of service controllers each being associated with one of the plurality of hot-plug devices;
determining, using at least one indicator pattern logic, a work mode of a power indicator of the hot-swappable switch, based at least in part on the plurality of signals; and
enabling the power indicator to display the determined work mode, the determined work mode including one of a transition state, a power-on state or a power-off state.

11. The computer-implemented method claim 10, further comprising:
transmitting a hot-plug request to the plurality of service controllers, the hot-plug request including one of a hot-add request or a hot-remove request.

12. The computer-implemented method claim 10, wherein the hot-swappable switch and the plurality of hot-plug devices are electrically connected by a PCIe bus.

13. The computer-implemented method claim 10, further comprising:
enabling the hot-swappable switch to be connected to or disconnected from the plurality of hot-plug devices without a rebooting of the plurality of hot-plug devices.

14. The computer-implemented method claim 10, wherein the hot-swappable switch comprises a plurality of network interface controllers, each of the plurality of network interface controllers configured to be associated with a device of the plurality of hot-plug devices.

15. The computer-implemented method claim 10, wherein the plurality of service controllers are configured to transmit the plurality of signals using an I2C bus.

16. A system, comprising:
a processor; and
a memory device including instructions that, when executed by the processor, cause the system to:
receive, at a controller of a hot-swappable switch, a plurality of signals form a plurality of hot-plug devices in communication with the hot-swappable switch, the plurality of signals configured to be generated by a plurality of service controllers each being associated with one of the plurality of hot-plug devices;
determine, using at least one indicator pattern logic, a work mode of a power indicator of the hot-swappable switch, based at least in part on the plurality of signals; and
enable the power indicator to display the determined work mode, the determined work mode including one of a transition state, a power-on state or a power-off state.

17. The system of claim 16, further comprising instructions that, when executed by the processor, cause the system to:
transmit a hot-plug request to the plurality of service controllers, the hot-plug request including one of a hot-add request or a hot-remove request.

18. The system of claim 16, wherein the hot-swappable switch and the plurality of hot-plug devices are electrically connected by a PCIe bus.

19. The system of claim 16, further comprising instructions that, when executed by the processor, cause the system to:
enable the hot-swappable switch to be connected to or disconnected from the plurality of hot-plug devices without a rebooting of the plurality of other hot-plug devices.

20. The system of claim 16, wherein the hot-swappable switch comprises a plurality of network interface controllers, each of the plurality of network interface controllers configured to be associated with a device of the plurality of hot-plug devices.

* * * * *